(12) United States Patent
Arnold et al.

(10) Patent No.: US 8,622,634 B2
(45) Date of Patent: Jan. 7, 2014

(54) OPTICAL FIBER ASSEMBLIES AND METHODS OF FABRICATING OPTICAL FIBER ASSEMBLIES

(75) Inventors: Misty Nichols Arnold, Lenoir, NC (US); Terry Lee Cooke, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 255 days.

(21) Appl. No.: 13/194,342

(22) Filed: Jul. 29, 2011

(65) Prior Publication Data
US 2013/0028560 A1 Jan. 31, 2013

(51) Int. Cl.
G02B 6/36 (2006.01)
G02B 6/38 (2006.01)

(52) U.S. Cl.
USPC .................................. 385/80; 385/60; 385/78

(58) Field of Classification Search
USPC ................................. 385/80, 60, 78
See application file for complete search history.

(56) References Cited

U.S. PATENT DOCUMENTS

| | | | |
|---|---|---|---|
| 4,198,119 A * | 4/1980 | Uberbacher | 385/81 |
| 4,984,865 A * | 1/1991 | Lee et al. | 385/53 |
| 6,536,956 B2 | 3/2003 | Luther et al. | 385/86 |
| 6,702,479 B2 | 3/2004 | Yang | 385/78 |
| 7,147,384 B2 * | 12/2006 | Hardcastle et al. | 385/60 |
| 7,264,402 B2 | 9/2007 | Theuerkorn et al. | 385/59 |
| 7,421,164 B2 * | 9/2008 | Cho et al. | 385/37 |
| 7,530,746 B2 * | 5/2009 | Kachmar | 385/76 |
| 7,785,019 B2 | 8/2010 | Lewallen et al. | 385/75 |
| 2002/0110333 A1 | 8/2002 | Yang | 385/78 |
| 2003/0021548 A1 | 1/2003 | Luther et al. | 385/86 |
| 2003/0133671 A1 * | 7/2003 | Murray et al. | 385/80 |
| 2004/0136678 A1 * | 7/2004 | Leeman et al. | 385/138 |
| 2005/0281518 A1 * | 12/2005 | Tanaka et al. | 385/114 |
| 2006/0115218 A1 | 6/2006 | Howard et al. | 385/59 |
| 2006/0204178 A1 | 9/2006 | Theuerkorn et al. | 385/59 |
| 2007/0160327 A1 | 7/2007 | Lewallen et al. | 385/53 |
| 2010/0310213 A1 | 12/2010 | Lewallen et al. | 385/75 |
| 2013/0028560 A1 * | 1/2013 | Arnold et al. | 385/80 |
| 2013/0136401 A1 * | 5/2013 | Cooke et al. | 385/80 |

* cited by examiner

Primary Examiner — Rhonda Peace

(57) ABSTRACT

A ferrule assembly includes a ferrule comprising a ferrule boot insertion end and a ferrule boot defining an optical fiber channel. The optical fiber channel of the ferrule boot is shaped to receive a plurality of optical fibers therethrough. The ferrule boot includes an outer shell and a heat-activated adhesive liner is positioned within the outer shell channel and coupled to the inner surface of the outer shell. A portion of the outer shell is sized to be at least partially inserted into the ferrule boot insertion end of the ferrule. The outer shell has a thermal melting point that is greater than a thermal melting point of the heat-activated adhesive liner such that the heat-activated adhesive liner melts for adhering the plurality of optical fibers to the outer shell upon receipt of thermal energy.

19 Claims, 8 Drawing Sheets

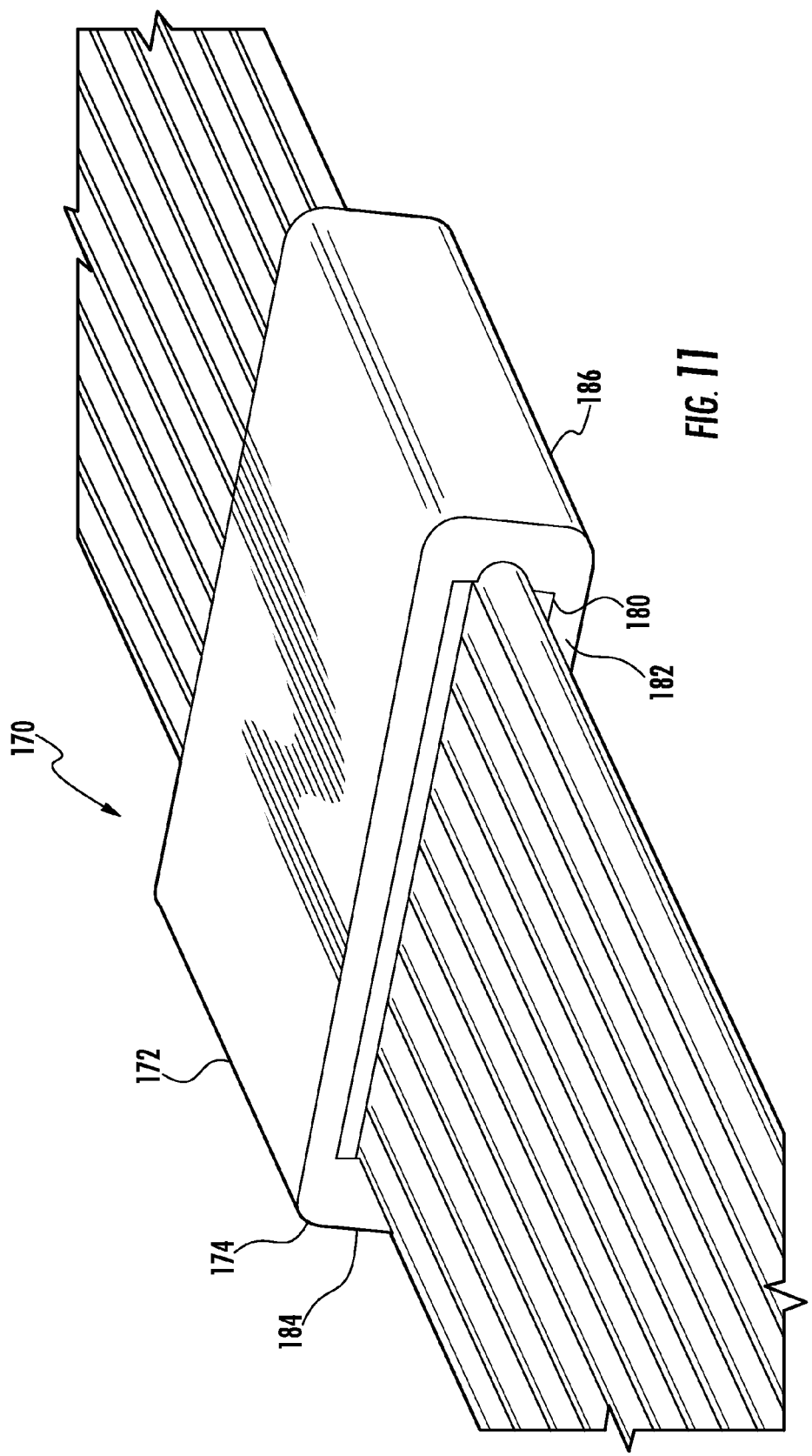

OPTICAL FIBER ASSEMBLIES AND METHODS OF FABRICATING OPTICAL FIBER ASSEMBLIES

TECHNICAL FIELD

The present specification generally relates to optical fiber assemblies, and more particularly to optical fiber assemblies including ferrule assemblies and methods of fabricating optical fiber assemblies.

BACKGROUND

Optical fiber communication systems typically include optical fiber connectors. For instance, one or more optical fiber connectors can be used to join adjacent segments of optical fiber together for creating optical connections that can be connected, disconnected, and/or reconfigured as desired. For instance, one or more optical fiber connectors can be used for joining an optical fiber segment to an optical device or joining two optical fiber segments. Typical optical fiber connectors include a conventional ferrule designed to hold an optical fiber in an appropriate orientation for optically joining the end of the optical fiber segment to an optical interface of an optical device or another optical fiber segment.

Conventional optical ferrule assemblies include one or more optical fibers that typically extend to a front face of a conventional ferrule and may protrude an appropriate distance from the face of the ferrule as desired. In order to provide the desired alignment, the ferrules define a pair of elongate alignment holes that receive and cooperate with respective alignment members, such as guide pins, to accurately align opposing ferrules, and in turn, the optical fibers mounted within the multifiber ferrules. In other words, the ferrule have alignment structure for precisely mating the optical fibers secured with ferrule with a complimentary device for the transmission of optical signals.

Optical fibers have also been arranged into fiber arrays for ease of installation into the optical fiber connectors. One known process of arranging optical fibers into optical fiber arrays is commonly referred to as ribbonization. One common approach for the ribbonization of optical fibers includes the use of tape that is applied along a suitable short length at the ends of the loose optical fibers for maintaining the optical fibers in a desired sequence. In other words, the optical fibers are arranged in the desired sequence at the ends of the fibers and a short piece of tape is applied to the fibers to maintain their position and aid the insertion of the plurality of fibers into the ferrule. By way of example, the ribbonized length maybe about one inch or longer as desired and trimming of the optical fibers and tape may be required to remove any excess length of the ribbonized portion. Such ribbonization of optical fibers can be labor intensive and time-consuming. Thus, there is an unresolved need to quickly and easily arrange optical fibers for insertion into a ferrule of an optical fiber assembly.

SUMMARY

In one embodiment, a ferrule assembly includes a ferrule comprising a ferrule boot insertion end and a ferrule boot defining an optical fiber channel. A ferrule boot includes an outer shell defining an outer shell channel extending therethrough. The outer shell includes an inner surface, an outer surface, an optical fiber insertion end, and a ferrule insertion end. A heat-activated adhesive liner is positioned within the outer shell channel and coupled to the inner surface of the outer shell. The outer shell is sized to be at least partially inserted into the ferrule boot insertion end. The optical fiber channel is shaped to receive a plurality of optical fibers. The outer shell has a thermal melting point that is greater than a thermal melting point of the heat-activated adhesive liner such that the heat-activated adhesive liner melts to adhere the plurality of optical fibers to the outer shell upon receipt of thermal energy.

In another embodiment, an optical fiber assembly includes a plurality of optical fibers, the optical fibers each having an insertion end. A ferrule boot defines an optical fiber channel and includes an outer shell defining an outer shell channel extending therethrough. The outer shell includes an inner surface, an outer surface, an optical fiber insertion end, and a ferrule insertion end. A heat-activated adhesive liner is positioned within the outer shell channel and coupled to the inner surface of the outer shell. The plurality of optical fibers is positioned within the optical fiber channel. The outer shell has a thermal melting point that is greater than a thermal melting point of the heat-activated adhesive liner such that the heat-activated adhesive liner melts to adhere the plurality of optical fibers to the outer shell upon receipt of thermal energy. A ferrule includes a ferrule channel therein and a ferrule boot insertion end. The ferrule insertion end of the ferrule boot is positioned within the ferrule channel at the ferrule boot insertion end of the ferrule. The plurality of optical fibers is secured within the ferrule channel of the ferrule such as by an epoxy or the like. The ferrule boot inhibits epoxy from escaping the ferrule channel of the ferrule.

In another embodiment, a method of fabricating an optical fiber assembly is provided. The method includes aligning a plurality of optical fibers in a desired sequence. The plurality of optical fibers is positioned through a ferrule boot. The ferrule boot includes an outer shell defining an outer shell channel extending therethrough. The outer shell includes an inner surface and an outer surface. A heat-activated adhesive liner is positioned within the outer shell channel and coupled to the inner surface of the outer shell. The outer shell has a thermal melting point that is greater than a thermal melting point of the heat-activated adhesive liner. Heat is applied to the ferrule boot such that the heat-activated adhesive liner adheres to the plurality of optical fibers to the outer shell. The plurality of optical fibers is positioned into a ferrule comprising a ferrule boot insertion end such that at least a portion of the outer shell of the ferrule boot is positioned within the ferrule at the ferrule boot insertion end. The plurality of optical fibers is secured in the ferrule.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute apart of this specification. The drawings illustrate the various embodiments described herein, and together with the description serve to explain the principles and operations of the claimed subject matter.

BRIEF DESCRIPTION OF THE DRAWINGS

FIG. 11 is a perspective view of another embodiment of a ferrule boot with optical fibers inserted therethrough according to one or more embodiments shown and described herein.

DETAILED DESCRIPTION

Embodiments described herein generally relate to optical fiber assemblies that include a ferrule boot that, itself, holds loose optical fibers in place relative to each other during assembly of the optical fiber assembly. The ferrule boot may comprise a preformed, multi-layer construction including an outer shell formed of a non-adhesive material and an adhesive liner positioned within the outer shell that, upon application of thermal energy, melts to adhere the optical fibers to the outer shell thereby holding the optical fibers in an array of optical fibers. The ferrule boot with the optical fibers held in the array may then be inserted or otherwise connected to a ferrule.

Figure 1:
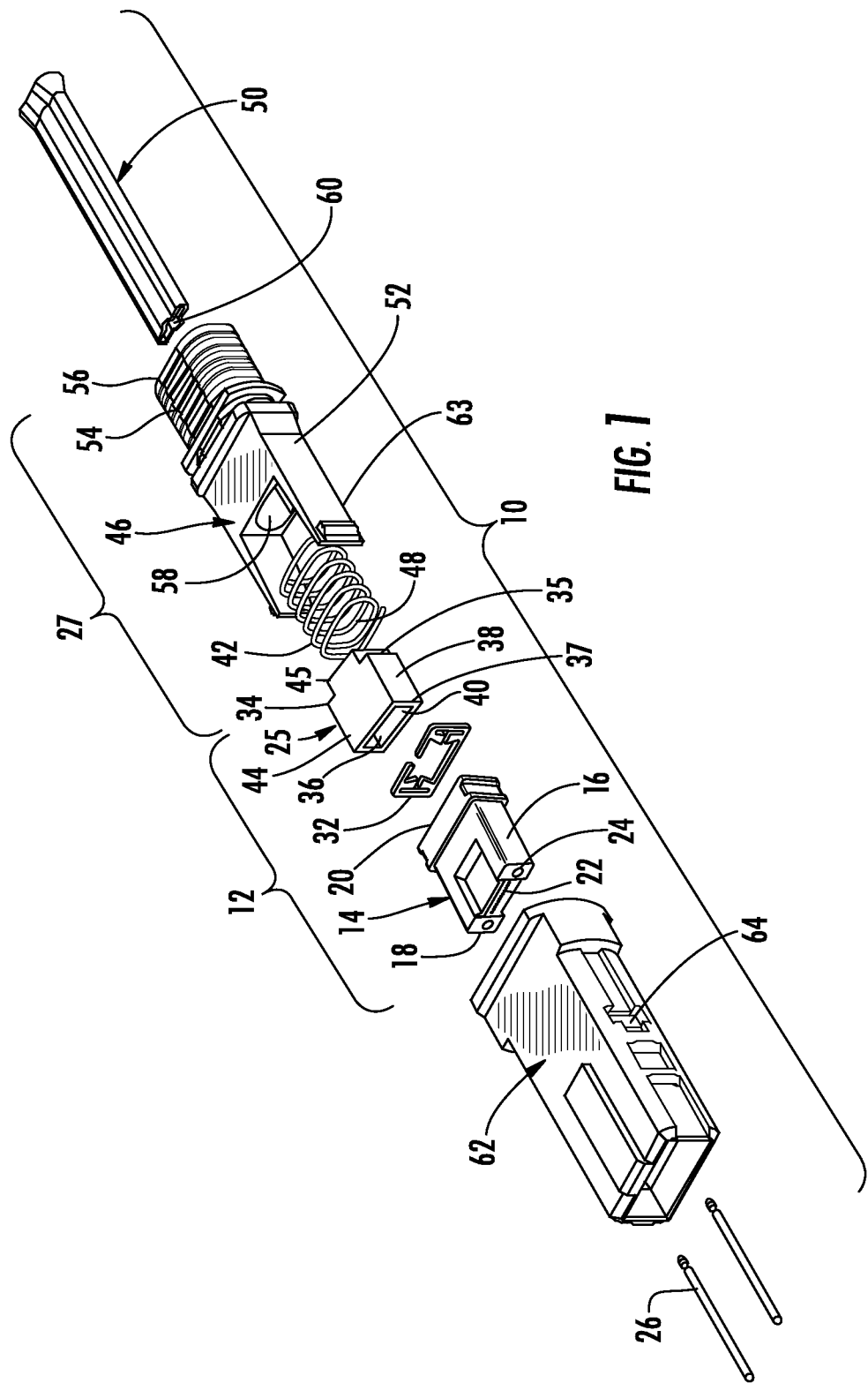
FIG. 1 is an exploded, perspective view of an optical fiber assembly according to one or more embodiments shown and described herein.

Referring to FIG. 1, an exploded perspective view of an exemplary optical fiber assembly 10 includes a multifiber ferrule assembly 12 including a ferrule 14 and a ferrule boot 25 that can be connected to the ferrule 14. A spring push assembly 27 can exert a biasing force through the ferrule boot 25 and on the ferrule 14, for example, when a pair of ferrule assemblies are brought into physical contact and mated together. The optical fiber assembly 10 can comprise various configurations and the concepts disclosed herein are applicable to other suitable optical fiber assemblies.

The multifiber ferrule assembly 12 includes the ferrule 14, which maybe an MT-type multifiber ferrule having a ferrule body 16 that is generally rectangular in lateral cross-section. Although an MT-type ferrule is illustrated and described herein, the ferrule 14 need not be an MT-type ferrule and may be any other type of multifiber ferrule. Regardless of the type, the ferrule 14 extends lengthwise within the multifiber ferrule assembly 12 between an end face 18 and an opposed rear face 20. In addition, the ferrule body 16 defines a plurality of bores 22 exposed through the end face 18. The bores 22 are arranged in a laterally extending linear row for receiving the end portions of respective optical fibers. Although the embodiments of the ferrule 14 illustrated herein define a total of twelve bores 22 such that the multifiber ferrule 14 can be mounted upon the end portions of twelve individual optical fibers, the end face 18 may have any number of bores, such as 2, 4, 6, 8, 10 or more. In addition, the ferrule 14 may include more than a single linear row of bores 22, such as two or more rows of bores 22 (e.g., of 12 bores per row). Furthermore, the bores 22 need not be arranged in one or more laterally extending linear rows. For example, any number of bores 22 may be arranged in any predetermined pattern on the end face 18 of the ferrule 14.

The ferrule body 16 may also have at least one elongate guide pin hole 24 also referred to as an alignment hole. The guide pin hole 24 opens through the end face 18 and is adapted to receive a respective guide pin 26 to align the ferrule 14 with an opposing ferrule of a mating connector. In the exemplary embodiments shown herein, the ferrule body 16 at least partially defines at least one or a pair of guide pin holes 24 for receiving respective guide pins 26. Each elongate guide pin hole 24 defined by the ferrule body 16 may, in turn, define a longitudinal axis extending through the center of the guide pin hole 24. The ferrule 14 is manufactured such that the longitudinal axis of each guide pin hole 24 is parallel to the bores 22 extending lengthwise through the ferrule body 16 and perpendicular to the end face 18. As illustrated in FIG. 1, the multifiber ferrule assembly 12 has a male configuration because the ferrule 14 is provided with the pair of guide pins 26 and a guide pin retainer, or pin keeper 32. The pin keeper 32 is positioned adjacent the rear face 20 of the ferrule body 16 to secure the guide pins 26 within the guide pin holes 24. In other embodiments, the pin keeper 32 may not be provided and thus form a female configuration. The guide pins 26 are secured such that their free ends protrude forwardly from the end face 18 of the ferrule body 16 a sufficient distance to engage the guide pin holes of the ferrule of a mating connector, thereby aligning the optical fibers mounted within the respective bores 22 of the opposing ferrules. The free ends of the guide pins 26 may be tapered and/or the guide pin holes 24 may be provided with a lead-in chamfer to facilitate insertion of the guide pins 26 into the guide pin holes 24 and to reduce pin stubbing and/or damage to the end face 18 during mating of the opposing ferrules.

The optical fiber assembly 10 further includes the ferrule boot 25 that includes a spring seat 34 at an optical fiber insertion end 35 and an optical fiber channel 36 that extends from the optical fiber insertion end 35 to a ferrule insertion end 37 for receiving a plurality of optical fibers. The ferrule boot 25 includes an outer shell 38 that is sized to be at least partially inserted into the ferrule 14 and a liner 40 positioned within the outer shell 38, which may be coupled to an inner surface of the outer shell 38, for example, during formation of the ferrule boot 25, which will be described in greater detail below. The ferrule boot 25 may maintained within the ferrule 14 (FIG. 2) using any suitable connection such as by a snap fit, an interference fit, an adhesive or the like.

The ferrule boot 25 is positioned adjacent the rear face 20 of the ferrule body 16, between the ferrule 14 and a coil spring 42 (or other suitable biasing member) of the spring push assembly 27. In some embodiment the ferrule 14 may include a ferrule boot insertion stop that locates the ferrule boot 25 in the ferrule 14. The optical fiber channel 36 extending through the ferrule boot 25 allows end portions of the optical fibers to pass through the ferrule boot 25 to the rear face 20 of the ferrule 14. In some embodiments, the ferrule boot 25 includes a forward portion 44 that engages and retains the pin keeper 32 between the ferrule boot 25 and the ferrule 14, and thereby securing the guide pins 26 within the guide pin holes 24 of the ferrule 14. The plurality of optical fibers is secured within a ferrule channel of the ferrule 14 by an epoxy or the like. The ferrule boot 25 can inhibit the epoxy from escaping the ferrule channel of the ferrule 14. The spring seat 34 may engage the forward-most coil of the coil spring 42. A force centering element 45 may be provided at the spring seat 34 that is used to engage the coil spring 42. The force centering element 45 may also include a spring cup interface portion that facilitates alignment of the coil spring 42.

The coil spring 42 is positioned between the spring seat 34 of the ferrule boot 25 and a spring push 46. An opening 48 extending lengthwise through the coil spring 42 permits a lead-in tube 50 and/or portions of the optical fibers (not shown) to pass through the coil spring 42 toward the rear face 20 of the ferrule 14. The coil spring 42 may be a conventional helical spring having dead coils with ground ends in certain embodiments and open coils in other embodiments. The compressive force of the coil spring 42 may vary depending on the type of fiber optic connector and multifiber ferrule, but preferably is in the range of about 9-11 Newtons. The spring push 46 comprises a forward portion 52 for engaging the rearward most coil of the coil spring 42, and thereby retaining the coil spring 42 against the force of the spring seat 34. The spring push 46 further includes a rearward portion 54 that defines a crimp body 56 for securing the strength members of a fiber optic cable (not shown) to the spring push 46. The lead-in tube 50 may be positioned within an opening 58 of the spring push 46, the opening 48 of the coil spring 42 and/or the optical fiber channel 36 of the ferrule boot 25. In other embodiments, a lead-in tube 50 may not be provided. An opening 60 extending lengthwise through the lead-in tube 50, when provided, receives and guides the optical fibers into the respective bores 22 of the ferrule 14.

Figure 2:
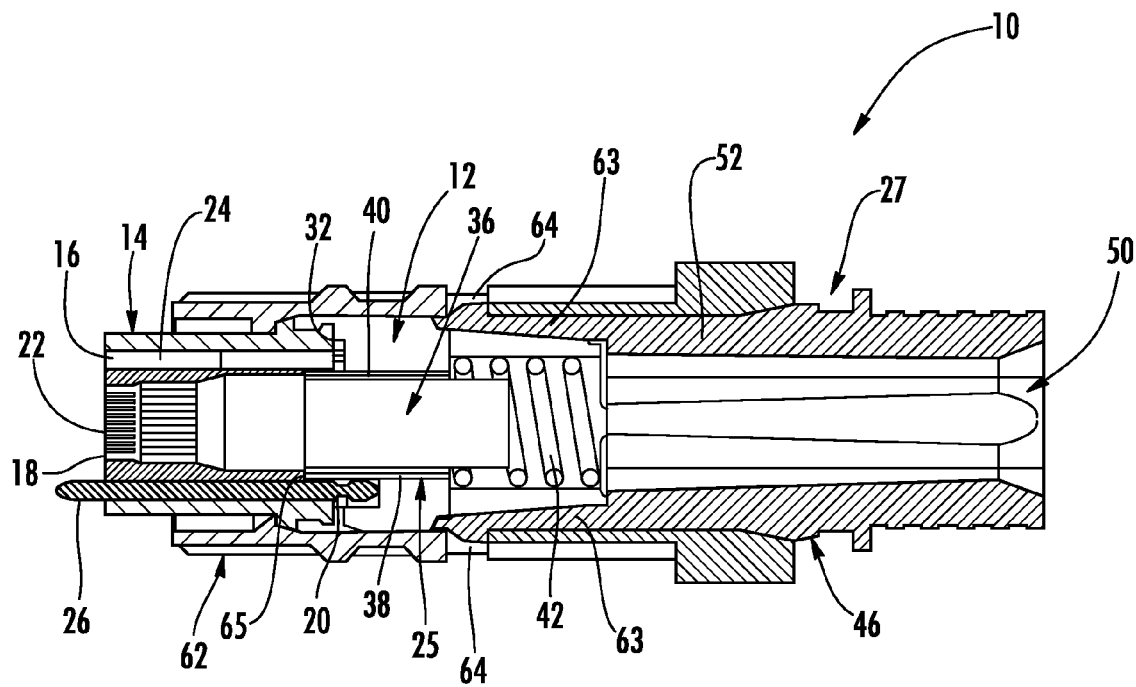
FIG. 2 is a section, top view of the optical fiber assembly of FIG. 1 in an assembled configuration.

Referring also to FIG. 2, the ferrule 14 and guide pins 26, the pin keeper 32, the ferrule boot 25, the coil spring 42, the forward portion 52 of the spring push 46 and the lead-in tube 50 may be positioned within a connector housing 62. Flexible arms 63 provided on spring push 46 depend lengthwise from the forward portion 52 to engage openings 64 formed in the connector housing 62 to secure the spring push 46 to the connector housing 62. A forward mechanical stop (not visible) is provided on the interior surface of the connector housing 62 so that the ferrule 14 is movably disposed within the connector housing 62, but is biased in the forward direction by the coil spring 42 and the ferrule boot 25. The ferrule boot 25 may stop against an internal geometry location 65 within the ferrule 14.

Figure 3:
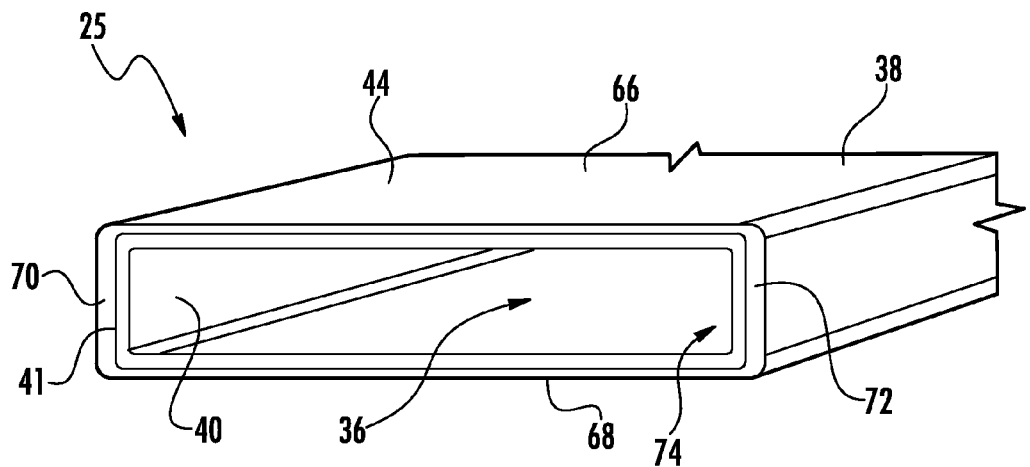
FIG. 3 is a partial, perspective view of a ferrule boot for use with the optical fiber assembly of FIG. 1 according to one or more embodiments shown and described herein.

Referring to FIG. 3, the forward portion 44 of the exemplary ferrule boot 25 is shown in isolation. The ferrule boot 25 has a generally rectangular cross-section and includes an upper wall 66, a lower wall 68 and sidewalls 70 and 72 that together form the outer shell 38 and an outer shell channel 74, but other cross-sectional shapes are possible. The liner 40 extends along the inner surface 41 of the outer shell 38 and along each of the upper wall 66, lower wall 68 and sidewalls 70 and 72 defining the optical fiber channel 36. In other embodiments, the liner may extend along only some of the walls, such as only the upper wall 66 and the lower wall 68.

Figure 4:
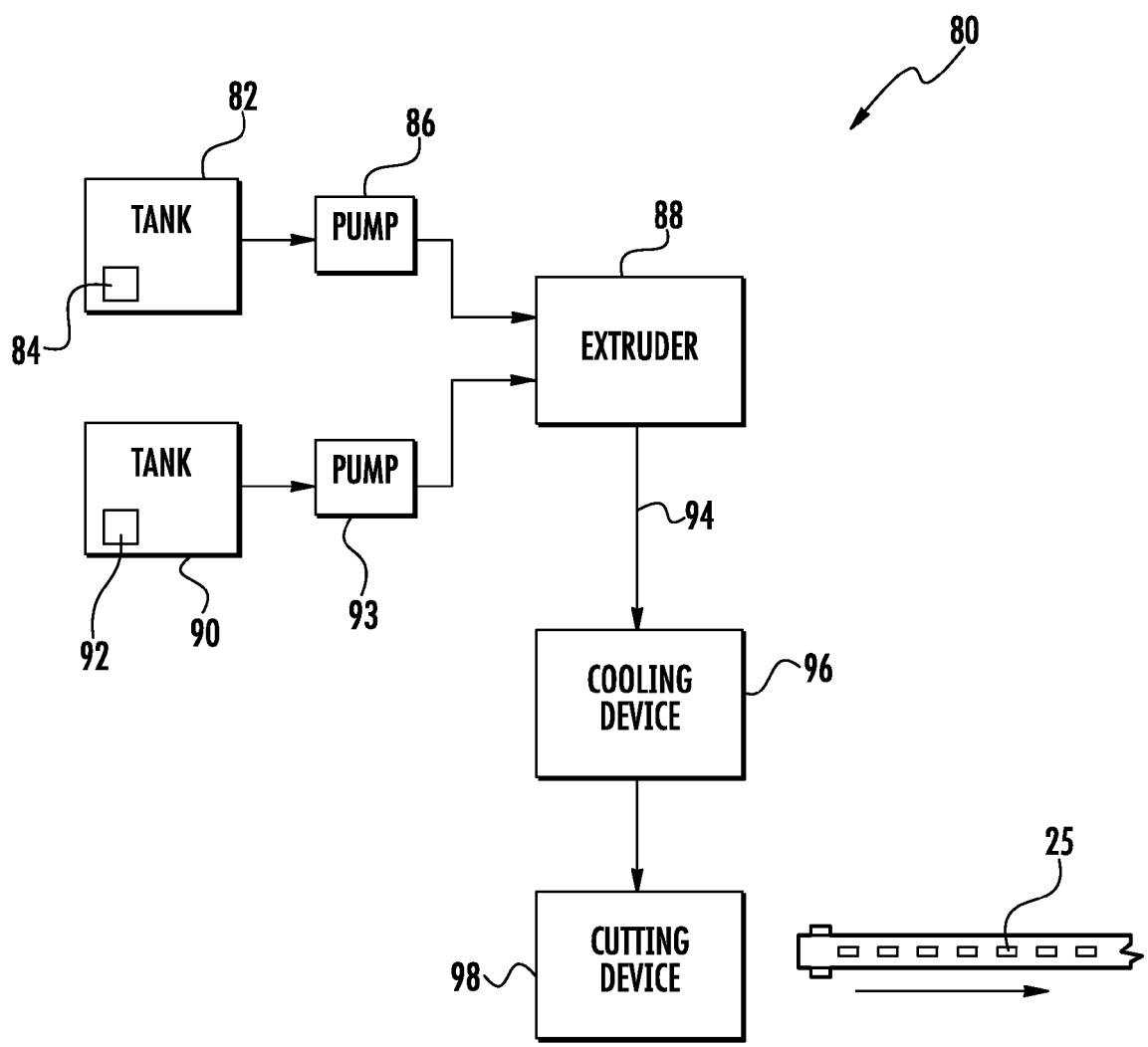
FIG. 4 is a diagrammatic illustration of a process for forming the ferrule boot of FIG. 3 according to one or more embodiments shown and described herein.

Referring to FIG. 4, the ferrule boot 25 may be formed using any suitable process, such as a co-extrusion process 80. In the embodiment of FIG. 4, a tank 82 contains a hot melt adhesive product that will be used to form the liner 40 of the ferrule boot 25. The adhesive product may be added to the tank 82 in any suitable form, such as granules, powder, etc. and can be liquefied there using a heating device 84. The adhesive product may also be added to the tank 82 already in liquid form and maintained in liquid form using the heating device 84.

The liquefied adhesive product may be transferred from the tank 82 to a metering pump 86. From the metering pump 86, the adhesive product may be transferred to an extrusion device 88, which can have any suitable configuration, such as a single or double screw extruder.

Another tank 90 contains a non-adhesive material that will be used to form the outer shell 38 of the ferrule boot 25. The non-adhesive material can be added to the tank 90 in the form of granules, powder, etc., and can be liquefied there by means of a heating device 92. The non-adhesive material also can be added to the tank 90 already in liquid form and kept there in a liquid state using the heating device 92.

The liquefied non-adhesive product may be transferred from the tank 90 to a metering pump 93. From the metering pump 93, the non-adhesive product may be transferred to the extrusion device 88.

The extruded product 94 may continuously issue from the extrusion device 88 and consists of the adhesive product from the tank 82 and the non-adhesive outer shell 38 from the tank 90 enveloping the adhesive product. The co-extruded product may then be conveyed to a cooling device 96, for example, composed of a passage containing water or other cooling material. The extruded product 94 may then be dried and cut to a desired length at a cutting device 98 to form the ferrule boot 25. Any other suitable work or secondary processing may be done to the extruded product, such as machining to form various features.

The adhesive material may be a hot melt adhesive and the outer shell 38 maybe formed of any suitable material such as flexible polyolefin, modified fluoroelastomer, or PVC. The outer shell 38 may be formed of a material having a thermal melting point that is greater than a thermal melting point of the material forming the heat-activated adhesive liner 40 such that the heat-activated adhesive liner 40 melts to adhere the plurality of optical fibers to the outer shell 38 of ferrule boot 25 upon receipt of thermal energy. The term "hot melt adhesive" is used herein generically to refer to both conventional and low application temperature hot melt adhesive, unless otherwise indicated. Low temperature hot melt adhesive and low application temperature hot melt adhesive are used interchangeably herein and refer to an adhesive which can be processed at temperatures below about 350° F. to as low as about 150° F. Various exemplary hot melt adhesives include those adhesives prepared from polymers and copolymers of synthetic resins, rubbers, polyethylene, polypropylene, polyurethane, acrylics, vinyl acetate, ethylene vinyl acetate and polyvinyl alcohol. More specific examples include hot melt adhesives prepared from rubber polymers such as block copolymers of monovinyl aromatic hydrocarbons and a conjugated diene, e.g., styrene-butadiene, styrenebutadiene-styrene, styrene-isoprene-styrene, styrene-ethylene-butylene-styrene and styrene-ethylene propylene-styrene; ethylene-vinyl acetate polymers, other ethylene esters and copolymers, e.g., ethylene methacrylate, ethylene n-butyl acrylate and ethylene acrylic acid; polyolefins such as polyethylene and polypropylene; polyvinyl acetate and random copolymers thereof; polyacrylates; polyamides; polyesters; polyvinyl alcohols and copolymers thereof; polyurethanes; polystyrenes; polyepoxides; graft copolymers of vinyl monomer(s) and polyalkylene oxide polymers; and aldehyde containing resins such as phenol-aldehyde, urea-aldehyde, melamine-aldehyde and the like.

Adhesives may be formulated with tackifying resins in order to improve adhesion and introduce tack into the adhesive. Such resins include, among other materials, natural and modified rosins, polyterpene resins, phenolic modified hydrocarbon resins, coumarone-indene resins, aliphatic and aromatic petroleum hydrocarbon resins, phthalate esters and hydrogenated hydrocarbons, hydrogenated rosins and hydrogenated rosin esters.

Optional ingredients include diluents, e.g., liquid polybutene or polypropylene, petroleum waxes such as paraffin and microcrystalline waxes, polyethylene greases, hydrogenated animal, fish and vegetable fats, mineral oil and synthetic waxes as well as hydrocarbon oils such as naphthionic or paraffinic mineral oils, stabilizers, colorants and fillers.

Figure 5:
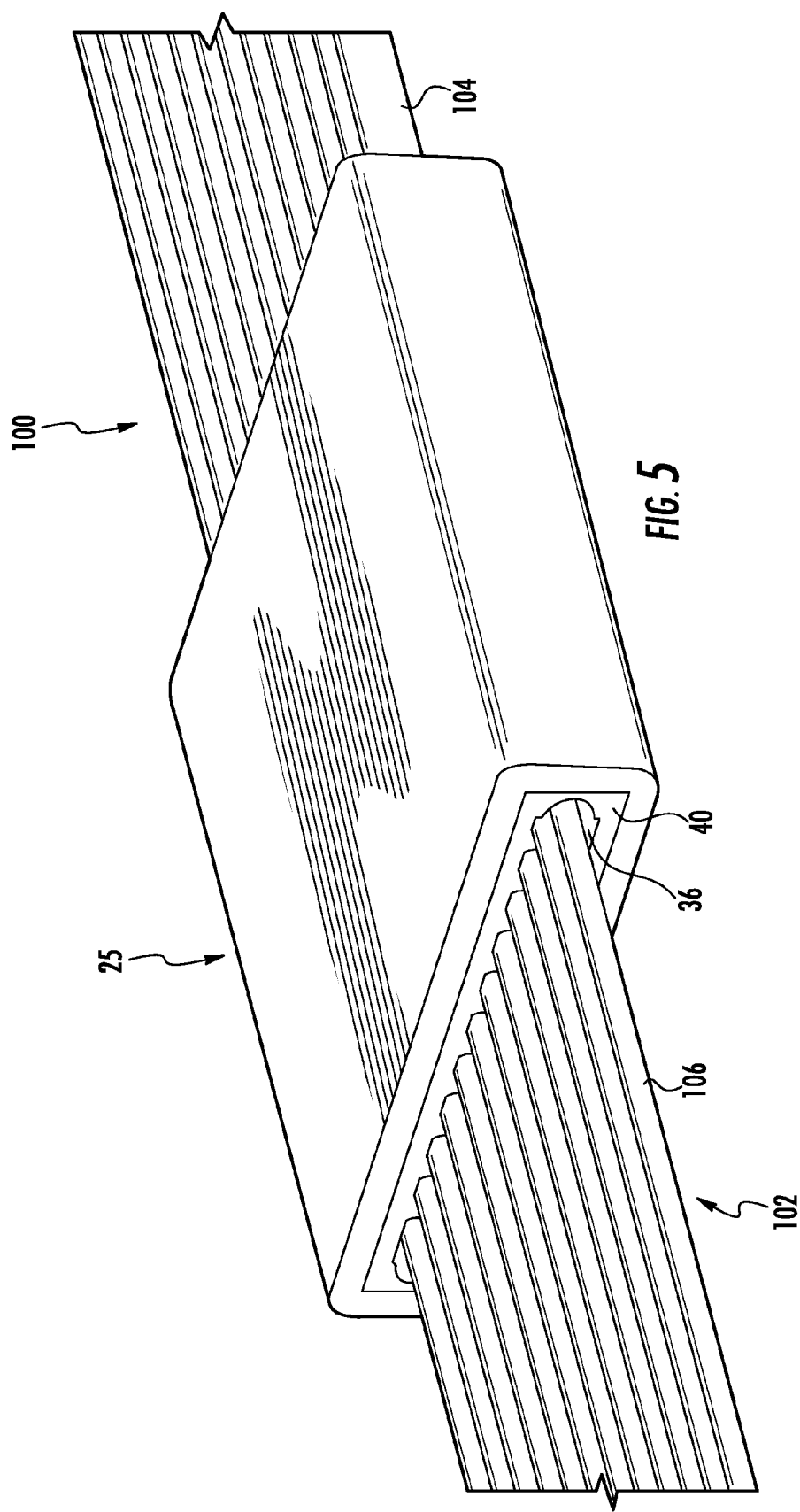
FIG. 5 illustrates a plurality of optical fibers inserted within a ferrule boot according to one or more embodiments shown and described herein.

Referring now to FIG. 5, once the ferrule boot 25 is formed, a plurality of optical fibers 100, each having an insertion end 102 maybe inserted through the optical fiber channel 36 of the ferrule boot 25. Prior to inserting the optical fibers 100, the methods may further include the step of processing the plurality of optical fibers 100. Processing can include cutting and/or polishing end portions of the optical fibers 100. In one example, the step of processing end portions includes cutting and polishing the plurality of optical fibers 100 with a laser beam of a laser in one or more steps. For instance, separate steps may be used for cutting and polishing optical fibers 100 with a laser, but cutting and polishing may also occur in one step with the laser. Any suitable type of laser and/or mode of operation for the laser is possible. By way of example, the laser may be a $CO_2$ laser operating in the pulse, continuous, or other suitable mode. The angle between the laser beam and optical fibers 100 may also be adjusted to produce the desired angle on the ends of optical fibers 100 such as 12 degrees, 8 degrees, or flat. Of course, mechanical methods for cutting and/or polishing optical fibers are also possible.

A work holder or alignment track fixture (not shown) may be used for proper placement of the plurality of optical fibers 100 into the optical fiber channel 36. In some embodiments, another work holder may be used to fix the position of the ferrule boot 25 as the optical fibers 100 are inserted. Once the plurality of optical fibers 100 are positioned in the optical fiber channel 36, heat may be applied (e.g., to the outside of the ferrule boot 25) to activate the adhesive liner 40. The adhesive material then encapsulates the optical fibers 100 and solidifies, holding the optical fibers 100 in the correct orientation in the array. In some embodiments, cladding 104 of the optical fibers 100 may be removed at the ferrule boot 25 (e.g., at a location within, and/or before the ferrule boot before or after the heating process) thereby exposing cores 106 of the optical fibers 100.

Figure 6:
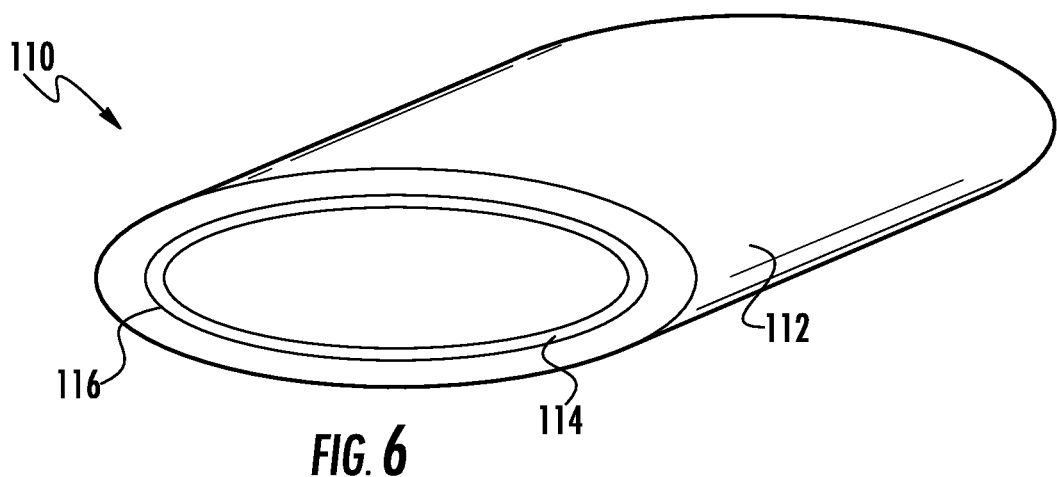
FIG. 6 illustrates another embodiment of a ferrule boot having a rounded sectional shape.

Other variations of ferrule boots employing the concepts disclosed herein are also possible. While a rectangular-shaped ferrule boot 25 is described above, other ferrule boot shapes and features may be provided. Referring to FIG. 6, another embodiment of a ferrule boot 110 having a generally round cross-section. The ferrule boot 110 includes an outer shell 112 and an adhesive liner 114 formed along an inner surface 116 of the outer shell 112.

Figure 7:
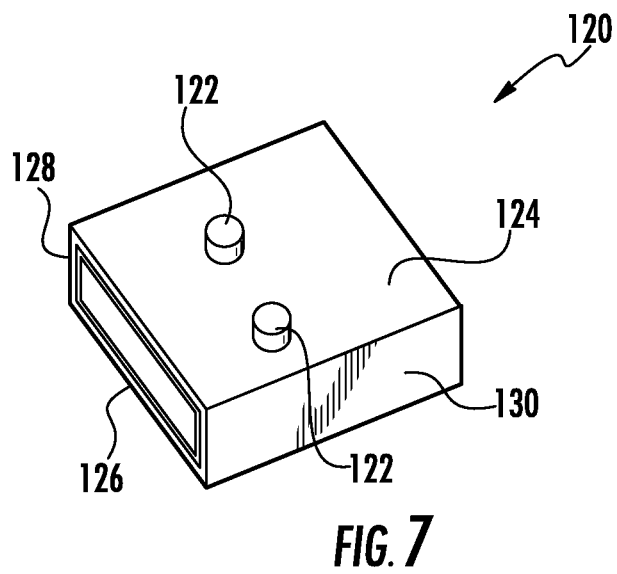
FIG. 7 illustrates another embodiment of a ferrule boot that includes one or more stops.

Beside different shapes ferrule boots can also include other suitable structures. Referring to FIG. 7, another embodiment of a ferrule boot 120 is rectangular in cross-section and includes one or more stop structures or pins 122 extending upwardly from its upper wall 124. In some embodiments, pins 122 may be provided at any of the walls 124, 126, 128 and 130. The pins 122 may mate in corresponding slots in the ferrule to locate and position the ferrule boot 120 in the ferrule. The pins may be formed using any suitable secondary process, such as machining, molding, bonding, etc.

Figure 8:
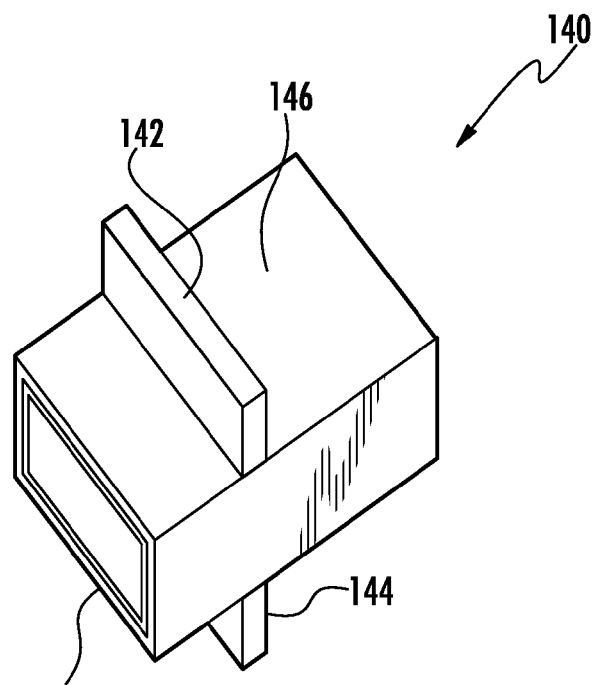
FIG. 8 illustrates another embodiment of a ferrule boot that includes one or more stops.
Figure 9:
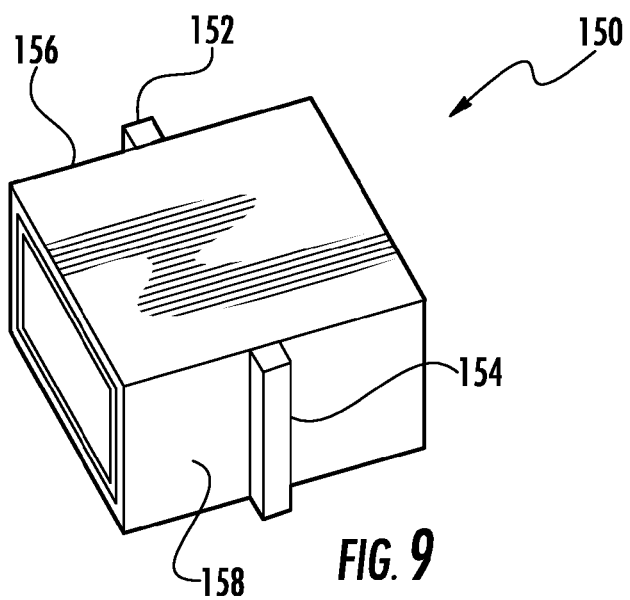
FIG. 9 illustrates another embodiment of a ferrule boot that includes one or more stops.

Referring to FIG. 8, another embodiment of a ferrule boot 140 includes stop structures 142 and 144 for controlling the insertion depth of the ferrule boot into the ferrule. In this embodiment, the stop structures 142 and 144 are located at an upper wall 146 and at a lower wall 148. The stop structures 142 and 144 may extend the entire or only a portion of the width of the ferrule boot 140. The stop structures 142 and 144 may be used to locate the ferrule boot 140 within the ferrule, to provide a seating location for the spring 42 and/or to provide a seating location for the pin keeper 32. FIG. 9 illustrates another embodiment of a ferrule boot 150 where stop structures 152 and 154 are located at sidewalls 156 and 158. The stop structures may be formed using any suitable secondary process, such as machining, molding, bonding, etc.

Figure 10:
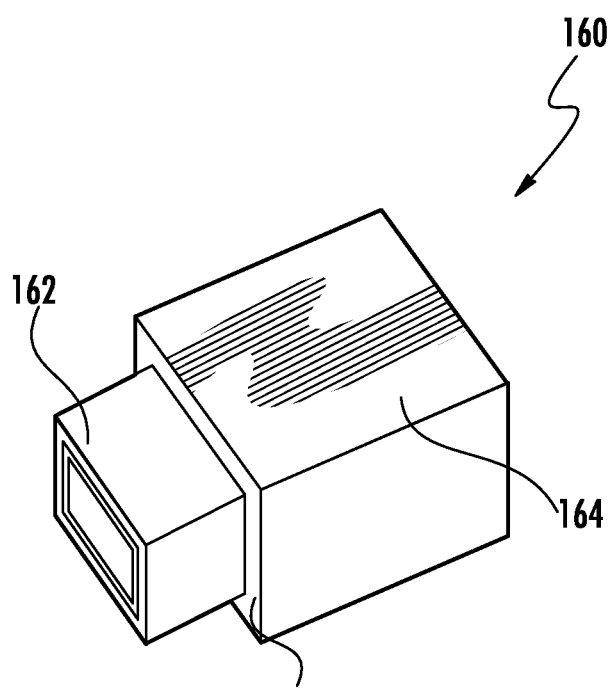
FIG. 10 illustrates another embodiment of a ferrule boot that includes portions having different outer dimensions.

Referring to FIG. 10, in another embodiment, a ferrule boot 160 includes a forward extending portion 162 having an outer dimension that is less than an outer dimension of a rearward extending portion 164. This can provide a step down surface 166 that can be used in positioning the ferrule boot 160 in the ferrule. For example, the optical fiber insertion end of the rearward extending portion 164 of outer shell 168 may contact the ferrule boot insertion end of the ferrule (e.g., at the step down surface 166) when the ferrule boot 25 is positioned within the ferrule.

As mentioned above, the adhesive liner of the ferrule boot, as formed, may not extend over all of the walls of the outer shell. Referring to FIG. 11, another exemplary ferrule boot 170 includes an outer shell 172 formed of the non-adhesive material as described above and an adhesive liner 174. In this embodiment, the adhesive liner 174 extends along inner surface 176 of an upper wall 178 and along inner surface 180 of a lower wall 182. Sidewalls 184 and 186 have no adhesive liner material, as formed and prior to the application of heat to melt the adhesive liner 174. In these embodiments, a width of the outer shell channel may be sized such that the sidewalls 184 and 186 substantially contact one or more of the plurality of optical fibers 100 inserted into the optical fiber channel.

The above-described ferrule boots can hold optical fiber arrays together, which can reduce any reworking need and scrap due to delamination. The ferrule boots can eliminate the use of tapes and other bonding substrates commonly used to ribbonize the array of optical fibers by providing a preformed adhesive liner within the ferrule boots that can be melted upon application of thermal energy. Additionally, there is no need for use of razor blades or other sharp objects in removing excess tape. The ferrule boots can work for a variety of fiber arrays such as between 2 and 24 optical fibers and multiple fiber rows. The ferrule boots can also serve as a reference point for downstream processes such as stripping cladding.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

We claim:

1. A ferrule assembly comprising:
 a ferrule comprising a ferrule boot insertion end; and
 a ferrule boot defining an optical fiber channel, comprising:
  an outer shell defining an outer shell channel extending therethrough, the outer shell comprising an inner surface, an outer surface, an optical fiber insertion end, and a ferrule insertion end; and
  a heat-activated adhesive liner positioned within the outer shell channel and coupled to the inner surface of the outer shell;
 wherein:
  the outer shell is sized to be at least partially inserted into the ferrule boot insertion end;

the optical fiber channel is shaped to receive a plurality of optical fibers;

the outer shell has a thermal melting point that is greater than a thermal melting point of the heat-activated adhesive liner such that the heat-activated adhesive liner melts to adhere the plurality of optical fibers to the outer shell upon receipt of thermal energy; and wherein the ferrule boot inhibits an epoxy inserted into the ferrule from escaping the ferrule boot insertion end of the ferrule when the ferrule insertion end of the ferrule boot is positioned within the ferrule boot insertion end of the ferrule and the epoxy is applied to the ferrule.

2. The ferrule assembly of claim 1, wherein the outer shell is formed by an extrusion or co-extrusion process.

3. The ferrule assembly of claim 1, wherein the outer shell and the heat-activated liner are co-extruded together.

4. The ferrule assembly of claim 1, wherein the outer shell has a generally round or rectangular cross-section.

5. The ferrule assembly of claim 1, wherein the heat-activated adhesive liner is coupled to one or more walls of the outer shell.

6. The ferrule assembly of claim 5, wherein a width of the outer shell channel is such that one or more walls substantially contact one or more of the plurality of optical fibers inserted into the optical fiber channel.

7. The ferrule assembly of claim 1, wherein the optical fiber channel is shaped to receive multiple-rows of optical fibers.

8. The ferrule assembly of claim 1, wherein the outer shell comprises polyolefin, modified fluoroelastomer, or PVC.

9. The ferrule assembly of claim 1, wherein the heat-activated adhesive liner comprises hot melt adhesive.

10. The ferrule assembly of claim 1, wherein the ferrule boot comprises a ferrule boot insertion stop configured to locate the ferrule boot within the ferrule.

11. The ferrule assembly of claim 1, wherein the ferrule comprises a ferrule boot insertion stop configured to locate the ferrule boot within the ferrule.

12. The ferrule assembly of claim 1, wherein the ferrule comprises a boot insertion stop within the ferrule configured to locate the ferrule boot within the ferrule.

13. The ferrule assembly of claim 1, wherein the optical fiber insertion end of the ferrule boot has a width and a height in cross section that is greater than a width and a height of the ferrule insertion end of the ferrule boot in cross section.

14. The ferrule assembly of claim 13, wherein the optical fiber insertion end of the outer shell contacts the ferrule boot insertion end of the ferrule when the ferrule boot is positioned within the ferrule.

15. The ferrule assembly of claim 1, wherein the ferrule insertion end of the ferrule boot is maintained within the ferrule boot insertion end of the ferrule by a snap fit, an interference fit or an adhesive.

16. The ferrule assembly of claim 1, wherein the ferrule assembly is a portion of a connector or a cable assembly.

17. An optical fiber assembly comprising:

a plurality of optical fibers, the optical fibers each having an insertion end;

a ferrule boot defining an optical fiber channel, comprising:

an outer shell defining an outer shell channel extending therethrough, the outer shell comprising an inner surface, an outer surface, an optical fiber insertion end, and a ferrule insertion end, wherein the optical fiber insertion end has a width and a height in cross section that is greater than a width and a height of the ferrule insertion end in cross section; and a heat-activated adhesive liner positioned within the outer shell channel and coupled to the inner surface of the outer shell, wherein:

the plurality of optical fibers is positioned within the optical fiber channel; and the outer shell has a thermal melting point that is greater than a thermal melting point of the heat-activated adhesive liner; and a ferrule comprising a ferrule channel therein and a ferrule boot insertion end, wherein:

the ferrule insertion end of the ferrule boot is positioned within the ferrule channel at the ferrule boot insertion end of the ferrule;

the plurality of optical fibers is secured within the ferrule channel of the ferrule;

individual ones of the plurality of optical fibers comprise an optical fiber core surrounded by a protective cover, and each individual optical fiber comprises a stripped region wherein the individual ones of the plurality of optical fibers are stripped to the optical fiber core at the insertion end at a stripped optical fiber length; and the stripped region of the plurality of optical fibers extends beyond the ferrule insertion end of the ferrule boot.

18. A method of fabricating an optical fiber assembly comprising:

aligning a plurality of optical fibers in a desired sequence;

positioning the plurality of optical fibers through a ferrule boot, the ferrule boot comprising:

an outer shell defining an outer shell channel extending therethrough, the outer shell comprising an inner surface and an outer surface; and a heat-activated adhesive liner positioned within the outer shell channel and coupled to the inner surface of the outer shell, wherein the outer shell has a thermal melting point that is greater than a thermal melting point of the heat-activated adhesive liner;

applying heat to the ferrule boot such that the heat-activated adhesive liner adheres to the plurality of optical fibers;

positioning the plurality of optical fibers into a ferrule comprising a ferrule boot insertion end such that at least a portion of the outer shell of the ferrule boot is positioned within the ferrule at the ferrule boot insertion end; and securing the plurality of optical fibers in the ferrule with an epoxy inserted into the ferrule before the plurality of optical fibers;

wherein the ferrule boot inhibits the epoxy inserted into the ferrule from escaping the ferrule boot insertion end of the ferrule when the ferrule insertion end of the ferrule boot is positioned within the ferrule boot insertion end of the ferrule.

19. The method of claim 18, further comprising removing the protective cover of individual ones of the plurality of optical fibers from an optical fiber stripping reference location to an end of the plurality of optical fibers, thereby forming a stripped region of the plurality of optical fibers.

* * * * *